Oct. 21, 1958 J. VAN WILGEN 2,857,520
STERILIZER FOR RUNNING LIQUIDS
Filed March 14, 1955
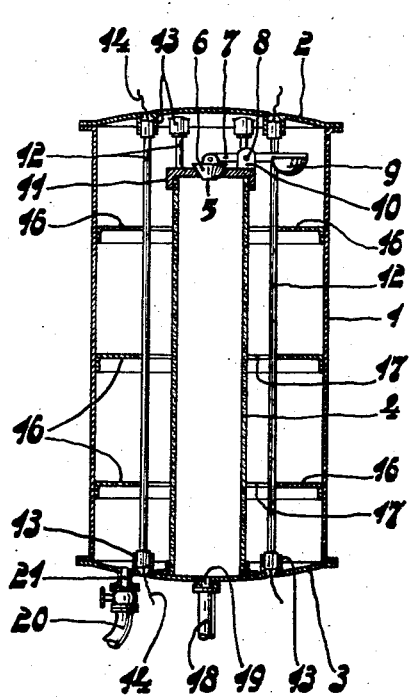
INVENTOR.
JACOB VAN WILGEN
BY
*Fred K. Vogel*
AGENT

United States Patent Office

2,857,520
Patented Oct. 21, 1958

2,857,520

STERILIZER FOR RUNNING LIQUIDS

Jacob van Wilgen, Emmasingel, Eindhoven, Netherlands, assignor, by mesne assignments, to North American Philips Company, Inc., New York, N. Y., a corporation of Delaware Application March 14, 1955, Serial No. 493,989

Claims priority, application Netherlands March 24, 1954

4 Claims. (Cl. 250—45)

Disinfection or sterilization of liquids is obtained by supplying germ-killing energy to the liquid, use being made of ultraviolet (U. V.) radiation. In order to absorb the required energy, the liquid must be exposed to the radiation for some time.

Apparatus are known which comprise one or more U. V. radiators the liquid remaining in the apparatus for the duration of the radiation. After the sterility has been obtained, the liquid is available for use and may be drawn off in any desired quantity at any moment. In accordance with the consumption, the radiation space, which constitutes at the same time the stock space, must be proportioned such that it can contain a sufficient quantity of liquid to provide for the maximum requirement in between two radiation periods. Therefore, such an apparatus is soon excessively bulky and is far from being economical.

Other known apparatus are based on the supply of energy to running liquids. During the time, when the liquid stays in the region acted upon by the radiation, it can flow rapidly and cover a long distance, but it may, as an alternative, be passed in a comparatively slow flow along the U. V. radiators. These apparatus are particularly intended for uninterrupted supply of the sterilized product. In order to control the consumption in quantity and time, such an apparatus has been connected to one or more stock containers, so that the radiation apparatus itself may be smaller and operate more economically. However, the output of the apparatus cannot be adapted to the consumption, since the radiators cannot be put out of operation. If from an apparatus intended for running liquids no regular quantities of liquid are drawn off, there is the disadvantage that, when taking the apparatus again in operation, a certain flow must have taken place before the sterile condition is again ensured. At the interruption of the flow, unsterilized liquid mixes with liquid having already absorbed sufficient energy. The mixture produced at an interrupted radiation in the sterilizer is not suitable for use.

The invention unites the advantages of an apparatus for running liquids, which implies small dimensions, with advantages inherent in the production of stock liquid. It relates to a sterilizer for running liquids, in which the disadvantage that the apparatus cannot be put out of operation between two instants when sterilized liquid is drawn off, is avoided and of which the dimensions are not appreciably increased owing to the presence of a stock space. According to the invention the liquid is conducted in an upward flow and a downward flow through the radiation field of the U. V. radiators in the apparatus and at the area of reversal of the flow provision is made of a self-closing valve which interrupts the upward flow, after the draining of liquid has ceased. Thus it is automatically possible to separate a space for the disinfected liquid from the space containing liquid not disinfected or disinfected to an inadequate extent. The opposite flow of the liquid permits to construct the apparatus in a manner such that the liquid passes twice the region covered by the ultraviolet rays.

The apparatus according to the invention is particularly suitable for use in medical treatment, in which sterilized water is required at any instant. For carrying out a known operation technique the surgeon must have several tens of litres of water at his disposal, this water being used for rinsing in small quantities of 2 to 3 litres. The apparatus may be connected directly to the existing water mains.

The drawing shows diagrammatically a longitudinal sectional view of the apparatus according to the invention.

The apparatus comprises a vertical, cylindrical vessel 1, which is closed at both ends by the lids 2 and 3. In the vessel is arranged coaxially a cylindrical tube 4 (central tube), which extends from the bottom 3 to near the lid 2. The connection of the central tube 4 with the bottom 3 is watertight. The space inside the central tube thus communicates with the further space in the vessel 1 only through the upper aperture 5, which is provided with a self-closing valve 6. This valve 6 is secured to a rod 7, having a pivotal point at 8. The other end of the rod 7 supports a float 9, the weight of which moves the valve upwards; in this position the aperture 5 leaves free the passage between the space inside the central tube 4 and the space outside it. The pivotal point 8 lies on a support 10, which is integral with a cap 11, that is secured to the end of the tube 4 and which is provided with the passage 5 to be closed by the valve.

Surrounding the central tube 4 provision is made of a plurality of ultraviolet lamps 12. The drawing shows four of the six lamps employed. The number may be higher or lower; it is advantageous to choose the number so that a uniform coverage of ultraviolet light is produced. The lamps are secured in holders 13, which are provided on the bottom 3 and the lid 2. The supply wires 14 are secured to contact pieces taken through the wall.

In the vessel 1 provision is made of a few intermediate partitions 16; these are annular plates, secured to the cylindrical wall of the vessel 1, each having an aperture 17, inside of which the ultraviolet lamps 12 are arranged.

The apparatus operates as follows. When put into operation, the ultraviolet lamps are switched on and the supply of the liquid to be sterilized is started. The liquid enters the central tube through the supply duct 18, which communicates through an aperture 19 in the bottom of the vessel with the space inside the central tube 4. This space is gradually filled with liquid. During the filling the liquid is irradiated. To this end the central tube 4 is made of a material which passes ultraviolet light in a satisfactory manner, for example quartz. The radiation by substantially unattenuated light suffices to sterilize adequately the liquid in the central tube 4 during its rise. The liquid then enters in sterile condition the space of the vessel 1 outside the central tube 4 through the aperture 5, so that, if desired at this instant the draining-off of sterile liquid may be started through the outlet duct 20, which communicates through the aperture 21 in the bottom of the vessel 1 with the internal space.

The central tube 4 constitutes the intermediate partition between the sterile space and the non-sterile space in the vessel 1. With a gradual increase of the liquid level in the space round about the tube 4, the ultraviolet light is absorbed partly in the liquid layer between the lamps 12 and the central tube 4, so that a smaller quantity of energy is transferred to the liquid column inside the tube 4. The liquid flowing through the aperture 5 is then not yet completely sterile, but during the passage a sufficient quantity of germ-killing energy is absorbed during the downward flow of the liquid. The intermediate partitions 16 serve to improve the eddying of the liquid, so that the irradiated energy is distributed as uniformly as possible in the liquid.

When the draining of the liquid ceases, the liquid level in the vessel 1 rises until the float is urged upwards and the valve 6 closes the aperture 5. This closure constitutes the separation between the non-sterile and the sterile part of the space inside the vessel 1, so that mixing of non-sterile liquid with sterile liquid is prevented. Thus the apparatus remains ready for use and after an interruption sterile liquid can immediately be drained off.

What is claimed is:

1. A liquid sterilizing apparatus comprising a closed receptacle, a container within said receptacle, the top of said container being spaced from the top of said receptacle, an inlet opening in said container and outlet opening in said receptacle, a plurality of ultraviolet light ray sources in said receptacle and at least partially surrounding said container, said liquid flowing upward in said container and downward in said receptacle while being exposed to radiation from said ultraviolet ray sources, and a self-closing valve located in the region of the reversal of direction of liquid flow, said valve being adapted to interrupt the upward flow of the liquid when the drawing off of the liquid from said apparatus is stopped.

2. A liquid sterilizing apparatus as set forth in claim 1 wherein said container is constituted of a substance pervious to ultraviolet light.

3. A liquid sterilizing apparatus as set forth in claim 1 wherein said plurality of sources of ultraviolet light uniformly surround said container.

4. A liquid sterilizing apparatus as set forth in claim 1 further comprising a plurality of annular, spaced partitions in said receptacle and secured to the inner wall thereof each of said partitions being positioned substantially transverse to the longitudinal axis of said receptacle and provided with an aperture in which the ultraviolet ray sources are arranged.

References Cited in the file of this patent

UNITED STATES PATENTS 2,667,584    Rhodes _____ Jan. 26, 1954

OTHER REFERENCES

"Applications of Germicidal Erythemal and Infrared Energy," by Luckiesh, 1946 edition, published by D. Van Nostrand Company, New York, N. Y., pp. 231–269.